Jan. 23, 1940.　　　　H. WEBER　　　　2,187,921
SPRING SUSPENSION FOR VEHICLE WHEELS
Filed Dec. 16, 1937
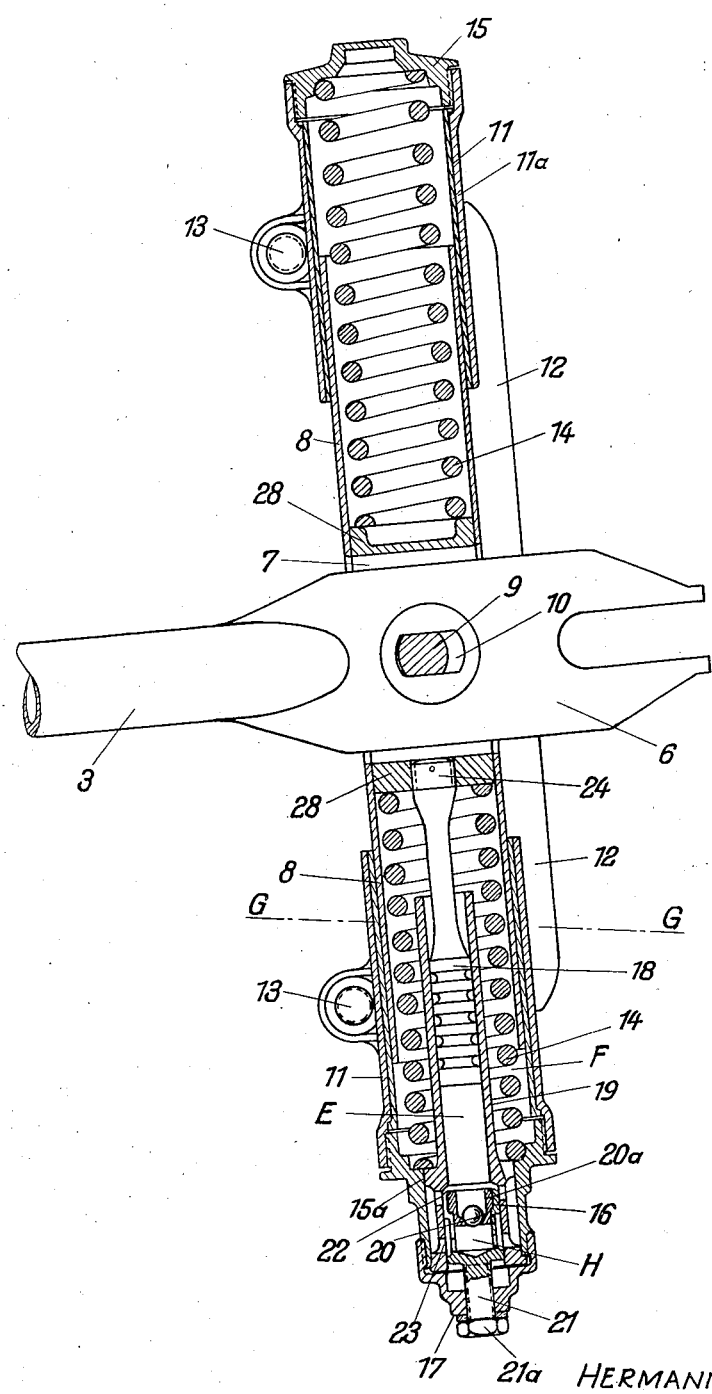
Inventor:
HERMANN WEBER
By: Richards & Geier
Attorneys Patented Jan. 23, 1940

2,187,921

UNITED STATES PATENT OFFICE 2,187,921

SPRING SUSPENSION FOR VEHICLE WHEELS

Hermann Weber, Zschopau, Germany, assignor to Auto Union Aktiengesellschaft, Chemnitz, Germany Application December 16, 1937, Serial No. 180,108
In Germany December 16, 1936

4 Claims. (Cl. 267—34)

This invention relates to spring suspension for a vehicle wheel.

In known constructions the vehicle wheel is carried in a pivoted fork member the ends of which coact with guiding pistons resiliently mounted in cylinders secured to the vehicle frame the movement of the guiding pistons being controlled solely by coil springs disposed above and below said guiding pistons.

Such an arrangement does not hold the wheel down onto the road to the desired extent. Moreover no provision is made for adjusting the spring suspension to suit different loads.

The invention has for primary object to provide an improved spring suspension unit for a vehicle wheel in which the movement of the guiding piston is not solely controlled by coil springs but by a damping device, working in conjunction with said coil springs, to prevent movements of too great amplitude whilst allowing movement of sufficient amplitude of the guiding pistons to enable the coil springs to hold the wheel down on to the road to the desired extent.

Another object of the invention is to incorporate a damping device, which may be in the form of a hydraulic damper, housed within the cylinders of the guiding piston so as to avoid the addition of an undue number of external parts whilst at the same time keeping the construction light and compact.

A further object of the invention is to provide means whereby the effect of the damper on the spring suspension unit may be adjusted to suit different loads and road conditions.

A still further object of the invention is to enable the adjustment to be effected easily and without having to dismantle any of the parts by providing a simple external adjusting member which actuates a valve or restricted passage of the hydraulic damper.

It is also a further general object of the present invention to provide a hydraulically damped spring suspension unit which is simple and inexpensive, light in weight, and small in dimensions and in which the effect is automatically suited to the speed of the vehicle.

With the above and other objects in view the invention consists in the improved spring suspension unit and in the construction and relative arrangement of the parts as will hereinafter by way of example be more fully described and illustrated in the accompanying drawing.

In the drawing wherein one embodiment of the invention has been illustrated, there is shown a sectional elevation of one of the guide pistons and associated parts.

A vehicle rear wheel (not shown) is carried and guided by a fork of which the end of one arm 3 is shown, the fork extending forwardly towards the vehicle frame, where it is mounted to pivot about a horizontal axis. As shown the arm 3 is formed or provided with a spade end 6 mounted in and passing through a central slot 7 in a guide piston 8 in such a manner that the wide faces of the spade end 6 are a close fit in the slot 7. The spade end 6 is slidably secured in the slot 7 by means of a flattened bolt 9 passing transversely through the slot 7 engaging an oblong hole 10 in the spade end. The guiding piston 8 has its two ends reciprocably mounted in two sleeve members, both denoted by the reference character 11 (hereinafter referred to as "cylinders"). The two cylinders 11 are arranged one above and one below the fork arm 3 and are connected together in rigidly spaced relationship by a tubular member 12, the cylinder unit thus formed being secured to the frame of the vehicle by screw bolts 13.

The guiding piston 8 has a solid central portion 28 in which the slot 7 is formed. The upper cylinder 11 is closed at the top by a screw cap 15 and the lower cylinder 11 is closed at the bottom by a screw threaded sleeve member 15a on which is screwed a closure cap 17. Mounted within the upper cylinder 11 and the upper part of the guiding piston 8 is a spring 14 acting on the cap 15 and on the solid central portion 28, whilst another spring 14 is mounted within the lower cylinder 11 and the lower part of the guiding piston 8 to act on the central portion 28 of the guiding piston 8 and on the sleeve member 15a. The downward movement of the guiding piston 8 is damped by a hydraulic damper provided in the lower cylinder 11. For this purpose the lower part of the central portion 28 of the guiding piston 8 is connected to an auxiliary piston 18 co-axial with the piston 8 and reciprocable in an auxiliary cylinder 19 secured to the sleeve member 15a. The space E in the auxiliary cylinder 19 is in communication with the space F in the cylinder 11 through restricted passages 22 and through a ball valve 20 admitting fluid in one direction only. The space F in the lower cylinder 11 is filled with oil, the fluid level being at G—G. The ball valve 20 is mounted in a slide member 16 in the bottom of the auxiliary cylinder 19, the slide member 16 having a screw threaded extension 21 passing through the closure cap 17 and secured externally thereof by a nut 21a. The slide member 16 partly overlaps the ports 22, thereby producing the restriction in said ports, the area of the aperture of said ports being adjustable from outside by adjusting the extension 21 after slackening the lock nut 21a. The ball valve 20 is mounted in the slide member 16 by means of an insert 20a; the space H thereby formed in the slide member 16 communicates with the space F in the main cylinder through ports 23 in the slide member 16 and in the auxiliary cylinder 19. In this way the hydraulic damper is completely enclosed in the lower cylinder 11.

If the road wheel makes an upward movement relative to the frame then the arm 3 of the fork swings upwardly, moving the piston 8 out of the lower cylinder 11 and into the upper cylinder 11, thereby placing the upper spring 14 under compression whilst allowing the lower spring 14 to expand. The auxiliary piston 18 thereby rises in the auxiliary cylinder 19 causing oil to flow from the space F into the space E through the passages 23 and the ball valve 20. On the road wheel of the vehicle moving back the spade end 6 of the fork arm 3 swings downwardly bringing about the opposite operation of the parts to that above described, the energy stored up in the compressed upper springs 14 being passed on in part to the lower springs 14 and in part being neutralised by the damper. On the piston 8 moving into the lower cylinder 11 the auxiliary piston 18 descends in the auxiliary cylinder 19 thereby forcing the oil in the space E into the cylinder space F through the restricted passages 22. The flow of the oil is throttled by the restrictions in the passages 22, the throttling causing the neutralisation of the energy imparted to the piston 8 whereby the swinging movements of the road wheel are absorbed and the road wheel is soon caused to remain in its normal position. The adjustability of the aperture of the passages 22 enables the degree of throttling to be conveniently controlled by means of the slide member 16 and suited to driving conditions. For example, the greater the load which is to be spring-suspended the smaller the apertures of the passages 22 are made.

By means of the screwed sleeve 15a the cylinder 19 can be conveniently and easily opened for inspection or other purposes. The same applies to the upper cylinder 11 to which access is given by the screw cap 15.

It will be understood that while one embodiment of the invention has been described, the invention is not restricted thereto and modifications can be made within the ambit of the appended claims.

Thus for example, the hydraulic damper according to the invention may be used on both sides of the fork arm, the upper cylinder 11 being provided with the same hydraulic damping means as that described for the lower cylinder. It is also possible for the spring suspension unit to be temporarily used without the damper by releasing the oil from the cylinder.

The spring suspension unit embodying the hydraulic damper according to the invention is primarily intended for use on the rear wheels of motor cycles, but it will be obvious that it can be applied to the wheels of other vehicles where it is required.

What I claim and desire to secure by Letters Patent is:

1. A spring suspension unit comprising a fork, guiding pistons having central portions connected with said fork and end portions; stationary cylinders in which the end portions of said guiding pistons are slidably guided, coiled springs engaging said pistons and said cylinders, a hydraulic damping piston operatively connected with one of the central portions of said guiding pistons and extending coaxially to one of said springs, a hydraulic damping cylinder in which said hydraulic damping piston is reciprocated, said hydraulic damping cylinder being situated within one of said stationary cylinders, and a screw-threaded closure member closing the last-mentioned stationary cylinder and carrying said hydraulic damping cylinder, the last-mentioned stationary cylinder serving as a container for the liquid of the hydraulic damping cylinder.

2. A spring suspension unit comprising a fork, guiding pistons having central portions connected with said fork and end portions; stationary cylinders in which the end portions of said guiding pistons are slidably guided, coil springs engaging said pistons and said cylinders, a hydraulic damping piston operatively connected with one of the central portions of said guiding pistons and extending coaxially to one of said springs, a hydraulic damping cylinder in which said hydraulic damping piston is reciprocated, said hydraulic damping cylinder being situated within one of said stationary cylinders and being smaller than the last-mentioned stationary cylinder, whereby a chamber is formed between these cylinders, a restricted passage being formed in said hydraulic damping cylinder for connecting the interior of the latter with said chamber, a ball valve connecting said interior with said chamber, and a screw-threaded closure member closing the last-mentioned stationary cylinder and carrying said hydraulic damping cylinder, the last-mentioned stationary cylinder serving as a container for the liquid of the hydraulic damping cylinder.

3. A spring suspension unit comprising a fork, guiding pistons having central portions connected with said fork and end portions, stationary cylinders in which the end portions of said guiding pistons are slidably guided, coil springs engaging said pistons and said cylinders, a hydraulic damping piston operatively connected with one of the central portions of said guiding pistons, a hydraulic damping cylinder in which said hydraulic damping piston is reciprocated, said hydraulic damping cylinder being situated within one of said stationary cylinders and being smaller than the last-mentioned stationary cylinder, whereby a chamber is formed between these cylinders, a restricted passage being formed in said hydraulic damping cylinder for connecting the interior of the latter with said chamber, a slide axially movable within said hydraulic damping cylinder to vary the operative cross-section of said restricted passage, means connected with said slide for manually adjusting the position thereof, and a screw-threaded closure member closing the last-mentioned stationary cylinder and carrying said hydraulic damping cylinder, the last-mentioned stationary cylinder serving as a container for the liquid of the hydraulic damping cylinder.

4. A spring suspension unit comprising a fork, guiding pistons having central portions connected with said fork and end portions, stationary cylinders in which the end portions of said guiding pistons are slidably guided, coil springs engaging said pistons and said cylinders, a hydraulic damping piston operatively connected with one of the central portions of said guiding pistons, a hydraulic damping cylinder in which said hydraulic damping piston is reciprocated, said hydraulic damping cylinder being situated within one of said stationary cylinders and being smaller than the last-mentioned stationary cylinder, whereby a chamber is formed between these cylinders, a restricted passage being formed in said hydraulic damping cylinder for connecting the interior of the latter with said chamber, a removable slide axially movable within said hydraulic damping cylinder to vary the operative cross-section of said restricted passage, a ball valve connecting said interior with said chamber and removably mounted in said slide, and a screw-threaded closure member closing the last-mentioned stationary cylinder and carrying said hydraulic damping cylinder, the last-mentioned stationary cylinder serving as a container for the liquid of the hydraulic damping cylinder.

HERMANN WEBER.